United States Patent
Baldwin et al.

(10) Patent No.: US 11,223,602 B2
(45) Date of Patent: Jan. 11, 2022

(54) IP ADDRESS ACCESS BASED ON SECURITY LEVEL AND ACCESS HISTORY

(71) Applicant: HEWLETT-PACKARD DEVELOPMENT COMPANY, L.P., Houston, TX (US)

(72) Inventors: Adrian J. Baldwin, Bristol (GB); Daniel C. Ellam, Bristol (GB); Jonathan Griffin, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 253 days.

(21) Appl. No.: 16/074,110

(22) PCT Filed: Sep. 23, 2016

(86) PCT No.: PCT/US2016/053517
§ 371 (c)(1),
(2) Date: Jul. 31, 2018

(87) PCT Pub. No.: WO2018/057008
PCT Pub. Date: Mar. 29, 2018

(65) Prior Publication Data
US 2021/0105251 A1    Apr. 8, 2021

(51) Int. Cl.
*H04L 29/06*    (2006.01)
*H04L 29/12*    (2006.01)

(52) U.S. Cl.
CPC ...... *H04L 63/0236* (2013.01); *H04L 61/1511* (2013.01); *H04L 63/105* (2013.01); *H04L 63/1416* (2013.01); *H04L 63/1466* (2013.01)

(58) Field of Classification Search
CPC .................. H04L 63/0236; H04L 61/1511
USPC .......................................................... 726/14
See application file for complete search history.

(56) References Cited

U.S. PATENT DOCUMENTS 6,961,783 B1 * 11/2005 Cook ............... H04L 29/12066
709/223
8,516,585 B2    8/2013  Cao et al.
(Continued)

FOREIGN PATENT DOCUMENTS

CN    103312716    9/2013
CN    104125209    10/2014
(Continued)

OTHER PUBLICATIONS

"HP ArcSight DNS Malware Analytics", HP, Retrieved from Internet: http://www.hp.com/sbso/hpinfo/newsroom/DNSMalwareAnalyticsDataSheet.pdf, 2015, 2 Pages.
(Continued)

*Primary Examiner* — Anthony D Brown
(74) *Attorney, Agent, or Firm* — HP Inc. Patent Department

(57) ABSTRACT

Examples disclosed herein relate to determining whether to allow access to an IP address based on a security level and domain name access information. In one implementation, a processor intercepts a response to a Domain Name System request related to a domain name and updates a security level based on the request and/or response. The processor may determine whether to forward or block the response based on the security level and a comparison of the domain name to stored information related to previous domain name access.

17 Claims, 4 Drawing Sheets

(56) References Cited

U.S. PATENT DOCUMENTS

| | | |
|---|---|---|
| 8,578,497 B2 | 11/2013 | Antonakakis et al. |
| 9,245,121 B1 | 1/2016 | Luo et al. |
| 2006/0036720 A1 | 2/2006 | Faulk |
| 2007/0180090 A1 | 8/2007 | Fleischman et al. |
| 2012/0303808 A1 | 11/2012 | Xie |
| 2015/0150079 A1 | 5/2015 | Hyatt et al. |
| 2015/0264070 A1 | 9/2015 | Harlacher et al. |
| 2015/0373043 A1 | 12/2015 | Wang et al. |
| 2016/0119282 A1* | 4/2016 | Bladel .................. G06Q 30/018 709/203 |

FOREIGN PATENT DOCUMENTS

| | | |
|---|---|---|
| CN | 104378452 | 2/2015 |
| CN | 104506538 | 4/2015 |
| CN | 104579773 | 4/2015 |
| CN | 105338123 | 2/2016 |
| CN | 105580333 | 5/2016 |

OTHER PUBLICATIONS

Mahjoub, "On The Trail Of Malicious Dynamic DNS Domains", Retrieved from Internet: https://umbrella.cisco.com/blog/2013/04/15/on-the-trail-of-malicious-dynamic-dns-domains/, Apr. 15, 2013, 6 Pages.

Luo et al., "Leveraging Client-Side DNS Failure Patterns to Identify Malicious Behaviors", IEEE, Retrieved from Internet: https://ieeexplore.ieee.org/document/7346852/, 2015, 9 Pages.

Nguyen et al., "DGA Botnet Detection Using Collaborative Filtering and Density-Based Clustering", Retrieved from Internet: https://dl.acm.org/citation.cfm?id=2833310, 2015, 7 Pages.

\* cited by examiner

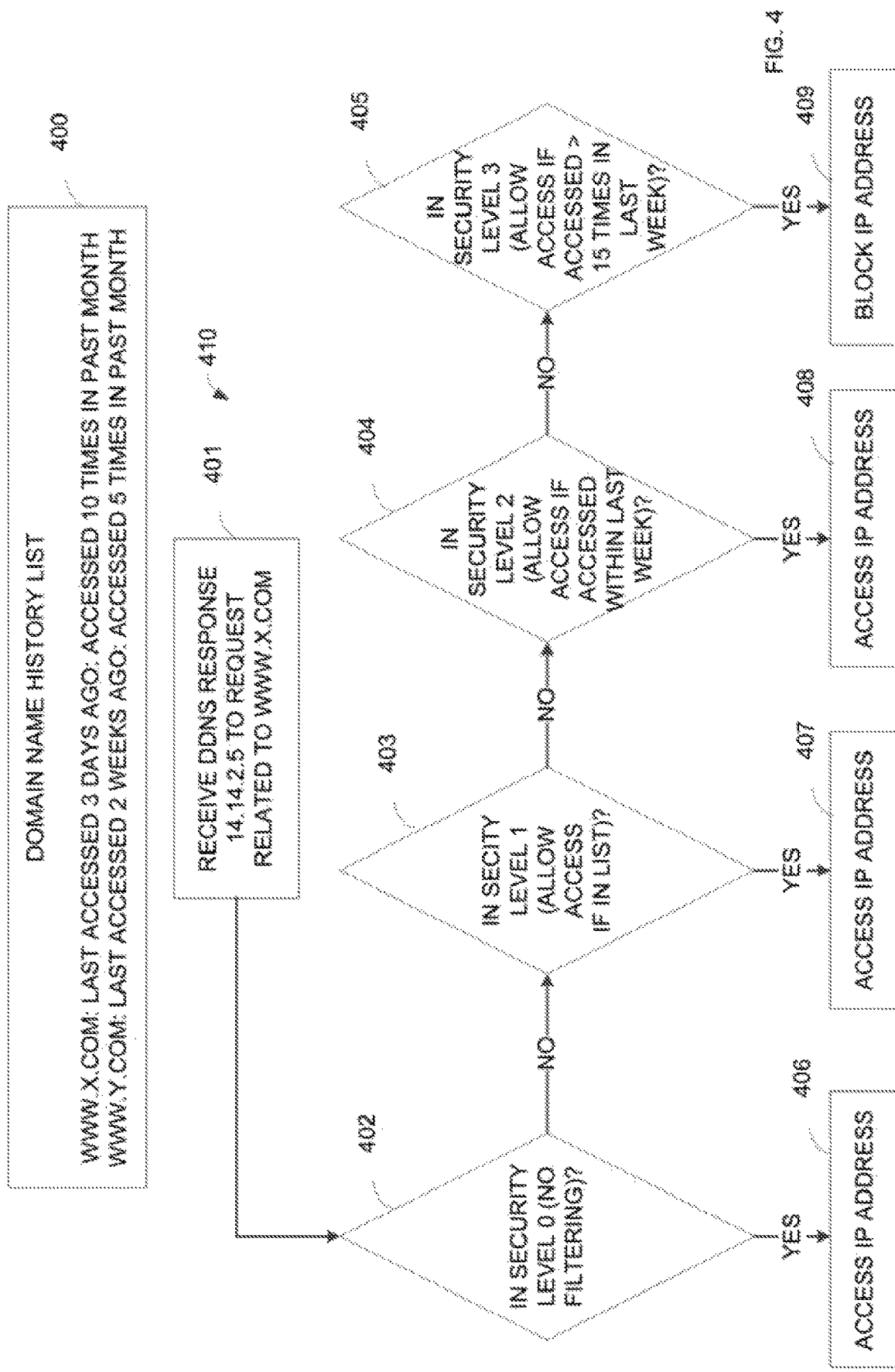

IP ADDRESS ACCESS BASED ON SECURITY LEVEL AND ACCESS HISTORY

BACKGROUND

Malware may use a command and control infiltration technique where malware on the compromised device communicates with a command and control center that sends instructions to the malware, such as to search or transmit data stored on the device. In some cases, a Domain Generation Algorithm may be used to generate a set of domain names that may be used by the malware to communicate with the command center such that the malware is still able to communicate with the command center when a subset of the domain names are blocked.

BRIEF DESCRIPTION OF THE DRAWINGS

The drawings describe example embodiments. The following detailed description references the drawings, wherein:

FIG. 4 is a diagram illustrating one example of IP address access differences based on different security levels.

DETAILED DESCRIPTION

In one implementation, a computing system intercepts a response to a Domain Name Service (DNS) request for an IP address related to a domain name. The computing system may determine whether to forward the IP address or block the IP address based on a security level and a comparison of the domain name to stored information related to previous domain name access. The security level may be determined based on aggregate network traffic information, and the previous domain name access information may include domain names previously accessed by an electronic device and/or user during a particular time period.

As an example, the computing system may determine a security level associated with an electronic device, such as whether the security level is on a network traffic filtering level. The computing system may determine whether to increase, maintain, or decrease the security level based on the DNS request and/or response. If in a network filtering mode, the computing system may compare the domain name associated with the DNS request to a list of previously accessed domain names. If the domain name is not on the list or does not meet other previous access criteria, an NXDOMAIN response may be sent in place of the IP address received DNS response such that the electronic device is not able to access the IP address. If the domain name meets the access criteria, the computing system may send the IP address received as the DNS response such that the electronic device may communicate using the IP address.

Using a system that determines whether to selectively block network traffic based on a detection of suspicious activity and new domain name requests may efficiently prevent or mitigate some cyberattacks. Preventing access to now domain names may prevent malware from using any of a set of potential domain names to communicate with a command and control center. The automated system may lessen the involvement and time of IT personnel monitoring and reduce the burden on users. For example, users may experience no change when the system is in a low security level without network filtering, and the effect during a higher security level may be limited to inability to visit new websites. The user may be able to continue to perform tasks that are related to previously visited websites, such as those frequently visited for as part of the user's job.

Figure 1:
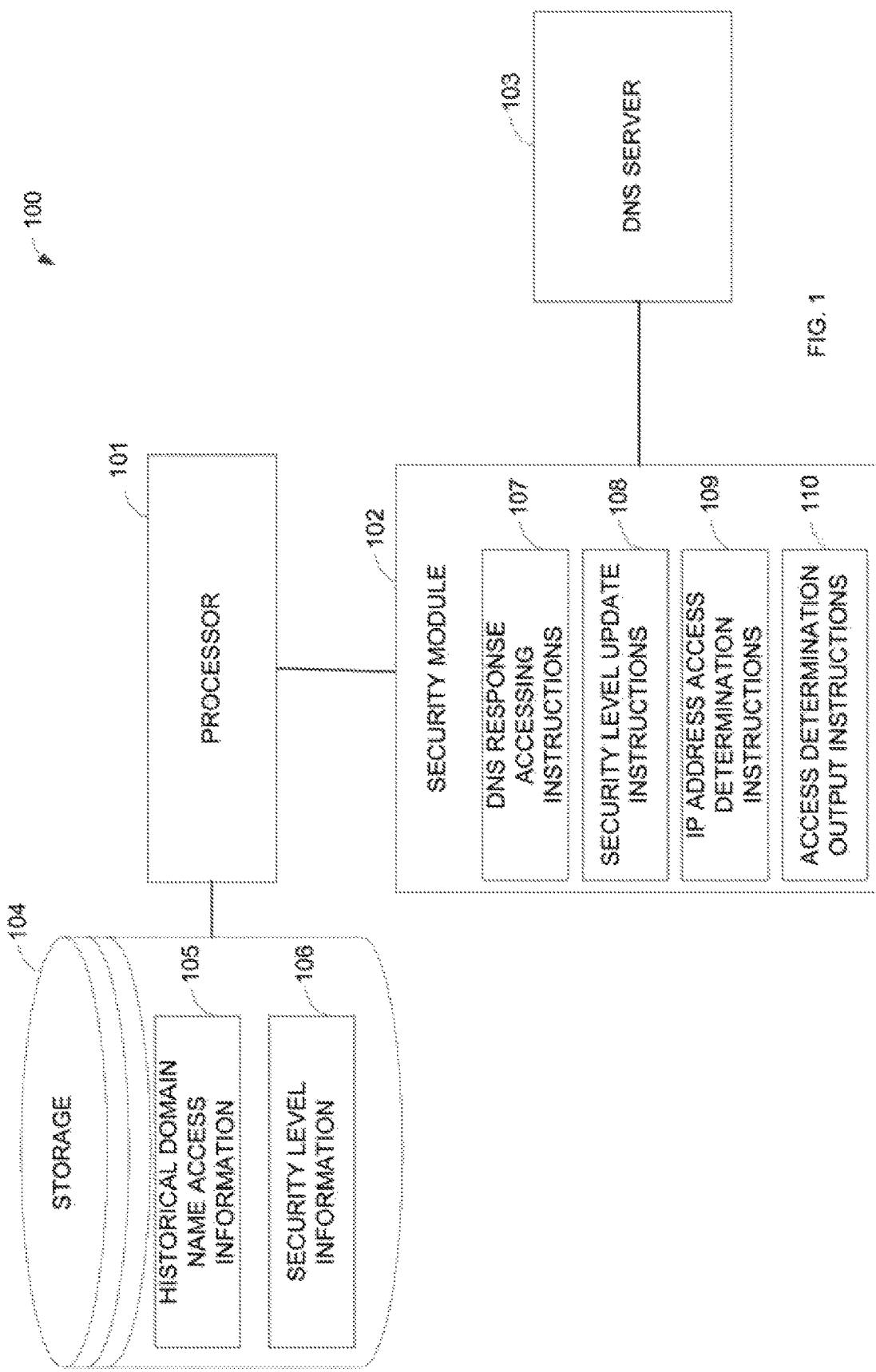
FIG. 1 is a block diagram illustrating one example of a computing system to determine IP address access based on security level and access history.

FIG. 1 is a block diagram illustrating one example of a computing system to determine IP address access based on a security level and access history. For example, the computing system 100 may determine whether to filter network traffic based on a security level. If the security level is at a network filtering level, a DNS domain name request may be compared to historical access information, such as a list of previously accessed domain names, to determine whether to allow access to the IP address received as the DNS response. The computing system 100 may include a storage 104, DNS server 103, processor 131, and security module 102.

The DNS Server 103 may be any suitable DNS server. For example, the DNS server 103 may resolve domain names using a DNS protocol to associate an IP address with a domain name. The DNS server 103 may receive a request from the processor 101, such as where the processor 101 executes security module 102 instructions to communicate with the DNS server 103. The processor 101 may communicate with the DNS server 103 via a network. The DNS server 103 may receive a request including a domain name from the processor 101 and respond to the processor 101 with the associated IP address.

The storage 104 may store historical domain name access information 105 and security level information 106. The storage 104 may be any suitable storage in communication with the processor 101. In one implementation, the processor 101 communicates with the storage 104 via a network.

The historical domain name access information 105 may include any suitable information related to historical domain name access. For example, the historical domain name access information 105 may include the domain name, related IP address, access time, and/or access frequency. The historical domain name access information 105 may be updated as additional domain names are accessed. The historical domain name access information 105 may be associated with access by a particular electronic device, access by a particular user, and/or access by a set of users. The historical domain name access information 105 may be augmented by additional domain names not previously accessed by the user or electronic device. For example, the historical domain name access information 105 may be augmented based on machine learning, external domain lists, and/or user input. As an example, the historical domain name access information 105 may include an additional domain name where a user accessed domain name A and machine learning indicates that 90% of users that accessed domain name A also access the additional domain name.

The security level information 106 may include information about a current security level. The security level information 106 may include a metric used to determine the security level associated with the processor 101. For example, an aggregate security metric about domain name access patterns may be stored and updated such that the security level is updated based on a comparison of the aggregate security metric to a threshold.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors. The processor 101 may be associated with any suitable computing device, such as a laptop or mobile computing device.

The processor 101 may communicate with the security module 102. The security module 102 may be embodied in hardware, firmware, and/or software. The security module 102 may be stored in the storage 104 or in a separate storage device or partition. The security module 102 may be stored in a machine-readable storage medium. The machine-readable storage medium may be any suitable machine readable medium, such as an electronic, magnetic, optical, or other physical storage device that stores executable instructions or other data (e.g., a hard disk drive random access memory, flash memory, etc.). The machine-readable storage medium may be, for example, a computer readable non-transitory medium.

The security module 102 may have any suitable configuration within the computing system 100 in relation to the DNS server 103. The security module 102 may be stored at the Error Control layer lower in a software stack than a requesting client application and DNS resolver. The security module may intercept a request to the DNS server 103 and/or a response from the DNS server 103. In the Error Control layer, the security module 102 may block traffic to and/or from the DNS server 103 by preventing it from moving up and down the software stack. In one implementation, the security module 102 resides at the application layer such that the security module 102 intercepts, monitors, and/or takes control of traffic to and/or from the DNS server 103. In one implementation, the security module resides on a network such that it monitors DNS server 103 requests and/or responses as they are forwarded across the network. In one implementation, the security module 102 is stored on the DNS server 103. For example, the security module 102 may perform security monitoring to multiple electronic devices sending requests to the DNS server 103, such as multiple electronic devices in the same corporate environment.

The security module 102 may include instructions executable by the processor 101 and/or another processor. For example, the security module 102 may include DNS response accessing instructions 107, security level update instructions 108, domain name access determination instructions 109, and access determination output instructions 110.

The DNS response receiving instructions 107 may include instructions to access information related to an IP address received as a response to a DNS request to the DNS server 103. For example, the processor 101 may analyze the received response prior to forwarding the IP address to allow the processor 101 to communicate via the IP address.

The security level update instructions 108 may include instructions to update the security level information 106 based on the DNS request to and/or the response from the DNS server 103. The security level information 106 may include information related to a current security level and network traffic summary information used to determine the security level. The security level may be a level indicating an amount or type of filtering or other analysis to be performed on a DNS request and/or response. For example, a higher security level, may indicate that more filtering should occur such that more responses from the DNS server 103 are filtered or blocked from the processor 101 to prevent the IP addresses from being accessed.

An aggregate security metric indicative of network traffic patterns may be updated based on the request and/or response, and the aggregate security metric may be compared to a set of criteria to determine whether to change or maintain the security level. The aggregate security metric may be compared to criteria related to a time period and/or the aggregate security metric may be periodically reset. For example, the criteria may be related to a number or percentage of occurrences of an event during a time period, such as a number of DNS requests per minute. The security level may be updated based on the amount the aggregate security metric exceeds a threshold, the number of times the aggregate metric exceeds a threshold, and/or the frequency the aggregate security metric is exceeded. The security level may be updated based on the detection of anomalies in aggregate security metrics related to different time periods. The aggregate security metric may be compared to a criteria to determine whether to change the security level. The criteria for lowering or raising the security may be dependent on additional information, such as the amount of time at which the security level has been heightened.

The aggregate security metric may include information related to requests to the DNS server 103 from the processor 101 or from the processor 101 in addition to other devices. For example, the aggregate security metric may include information about a quantity, such as number or percentage, of DNS requests to the DNS server 103, DNS requests related to domain names not included in the historical domain name access information 105, DNS requests related to the sub-domains of the same domain, and/or non-duplicate domain name DNS requests. The aggregate security metric may include any suitable information related to a response from the DNS server 103, such as the number of responses from the DNS server 103 indicating no response or no associated IP address, indicating no response or no associated IP address associated with unique domain names requested during a time period, and/or indicating no response or no associated IP address associated with unique domain names requested during a time period and not included in the historical domain name access information 105. In some cases, the values of multiple metric types may be compared to different thresholds to determine the security level.

The domain name access determination instructions 109 may include instructions to determine whether to allow access to the IP address based on the security level and a comparison of the domain name to the historical domain name access information 105. If the security level is set to a level not associated with network traffic filtering, access may be provided to the DNS server 103 response such that the processor 101 may communicate using the received IP address. If the security level is set to a network filtering level, the processor 101 may allow access to the DNS server 103 response if the domain name requested from the DNS server 103 is included in the historical domain name access information 105. For example, when in a filtering mode, the IP address may be provided for domain names that have been previously accessed. In one implementation, there may be multiple security levels such that a criteria for the comparison of the domain name request to the historical domain name access information 105 is associated with the security level, such as where access is limited to domain names meeting more stringent criteria when the security level is higher.

The access determination output instructions 110 may include instructions to output information related to the access determination. For example, the information about the access may be stored, transmitted, and/or displayed. In one implementation, the IP address is accessed in response to an access determination to allow access. In one implementation, the processor 101 updates the historical domain name access information 105 to include information about the accessed domain name. For example, if not in a filtering mode, a new domain name may be accessed and added to the domain name previous access information 105.

Figure 2:
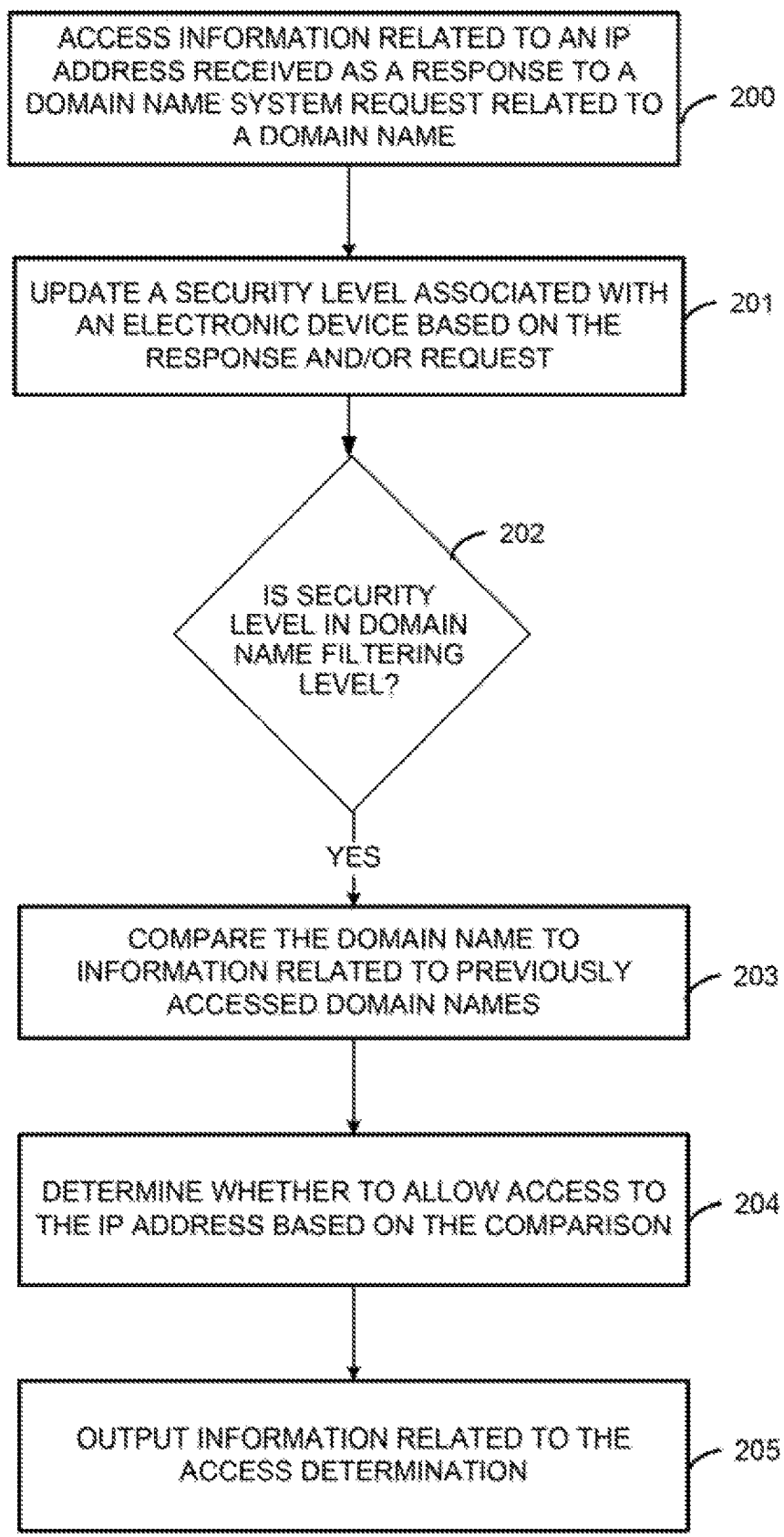
FIG. 2 is a flow chart illustrating one example of a method to determine IP address access based on security level and access history.

FIG. 2 is a flow chart illustrating one example of a method to determine IP address access based on a security level and access history. For example, a processor may automatically determine a security level based on a comparison of network traffic pattern information to security level threshold information. The processor may determine whether to filter network traffic based on the security level such that when in a heightened security level, IP address access may be limited to IP addresses resolved for domain names previously accessed. The method may be implemented, for example, by the computing system 100 of FIG. 1.

Beginning at 200, a processor accesses information related to an IP address received as a response to a DNS request related to a domain name. For example, the domain name may be received as user input to access a web page with a particular domain name. For example, the domain name may be received by an application, such as a web browser, that makes a request to a DNS server to resolve the received domain name. The domain name may be compared to a local cache to determine if it can be resolved with the locally stored IP address information, and the processor may then communicate with a remote DNS service via a network if the IP address information is not stored locally. DNS servers may be recursively queried until an IP address response is received or the request is terminated and associated with a NXDOMAIN response.

In some cases, a processor may receive a non-resolving response to a DNS request, such as an NXDOMAIN response. The processor may update summary network traffic information, such as an aggregate security metric, to indicate the receipt of the response. For example, a security level may be heightened when the number of NXDOMAIN responses reaches a threshold during a particular time frame. The processor may then forward the NXDOMAIN response to the requesting application to indicate the lack of a response.

Continuing to 201, a processor updates a security level associated with an electronic device based on at least one of the request and the response. The security level may be associated with any suitable device and/or user. For example, the security level may be associated with a user and associated with the electronic device when a user logs on. A security level may be associated with a security measure for preventing or mitigating a cyberattack. For example, the security measure may be related to filtering a DNS server request and/or response. The security level may be related to any suitable filtering method, and there may be multiple security levels such that more or less filtering is performed based on the level.

The security level update may occur at any suitable time, such as before or after determining whether to filter the received DNS response. For example, the access determination may be made based on a current security level such that the security level is updated based an both the request and response when the access is complete. As another example, the processor may filter the DNS request such that the access determination is based on the current security level, and the domain name request is not transmitted to the DNS server where access is denied. The security level may be updated subsequent to the access approval or denial.

The processor may update the security level based on a comparison of aggregate security information to a criteria associated with a security level classification, such as a threshold. For example, the aggregate security information may be updated based on the DNS request and/or response, and the aggregate security information may be used to update the security level. The security level may be determined based on aggregate security information criteria that indicate patterns for a cyber threat, such as patterns indicative of malware communicating with a command and control center.

The aggregate security information may indicate the form and/or frequency of network traffic. The aggregate security information may be summary information about a set of DNS requests and/or responses during a time period. For example, the aggregate security information may be related to a number or percentage of DNS requests, DNS requests returning no response, requests related to domain names requested not included in the domain name access list, domain name requests related to sub-domains of the same domain, nor-resolving domain names not in an access history list, and/or non-duplicate domain names.

The security level may be decreased, increased, or maintained. The security level may be updated based on the aggregate security information in any suitable manner. For example, the security level may be updated based on the amount the aggregate security information exceeds a threshold, the number of times the aggregate security information has exceeded a threshold, the amount of time at which the security level has been at a particular level, and/or the frequency the aggregate security information exceeds a threshold. In one implementation, different criteria is used to determine whether the security level should be changed than used to determine whether to maintain the security level, such as where a heightened criteria is used to lower the security level from a high alert compared to the criteria to enter me high alert status from a lower alert status. The security level may be based on a particular time frame, such as where the aggregate security metric is compared to a threshold for a particular time frame to determine to lower the security level.

In one implementation, the processor outputs an alert to indicate if the security level is increased, such as by displaying, storing, or transmitting information. For example, a message may be automatically sent to an administrator to indicate the change in security level for a device or set of devices.

Continuing to 202, a processor determines whether a security level is in a domain name filtering level. For example, there may be multiple security levels. A first security level may indicate that the system is at low risk, and no network traffic filtering is performed. A second security level may indicate that the system is at higher risk.

If in a domain name filtering level, continuing to 203, a processor compares the domain name to information related to previously accessed domain names. For example, the processor may determine whether the domain name is in a list of previously accessed domain names. The processor may analyze any suitable criteria related to previous access, such as whether the domain name was previously accessed within a particular time frame or frequency or whether the domain name was previously accessed by a particular set of users.

The information related to previously accessed domain names may include any suitable list of domain names, such as domain names previously accessed by an electronic device, user, and/or organization. The list of previously accessed domain names may be augmented to include additional domain names considered to be safe for access, such as domain names added based on shared access information among multiple users.

Continuing to 204, a processor determines whether to allow access to the IP address based on the comparison. The previous access information maybe compared to criteria related to access for the particular security level. For example, in a first security level, the processor may determine to allow access to the DNS response if the domain name has been previously accessed within a particular time period.

Continuing to 205, a processor outputs information related to the access determination. For example, information about the access determination may transmitted or stored. In one implementation, the processor forwards the IP address for use for communication if access is allowed.

In one implementation, if in a security level without filtering the processor may add the domain name to the previous domain name access list such that if the security level increases to a filtering level, access would continue to be allowed for the domain name. The processor may update the previous domain name access list based on the determination. For example, if access is allowed, the processor may update the access time and date information.

The processor may update the aggregate security information based on the access information, such as to indicate that access was not allowed. For example, if the DNS response is an NXDOMAIN response, information about the response may be used to update the aggregate security information. In one implementation, the domain is stored such that if legitimate access occurs, the information, such as time, related to the approved request is associated with the domain name.

Figure 3:
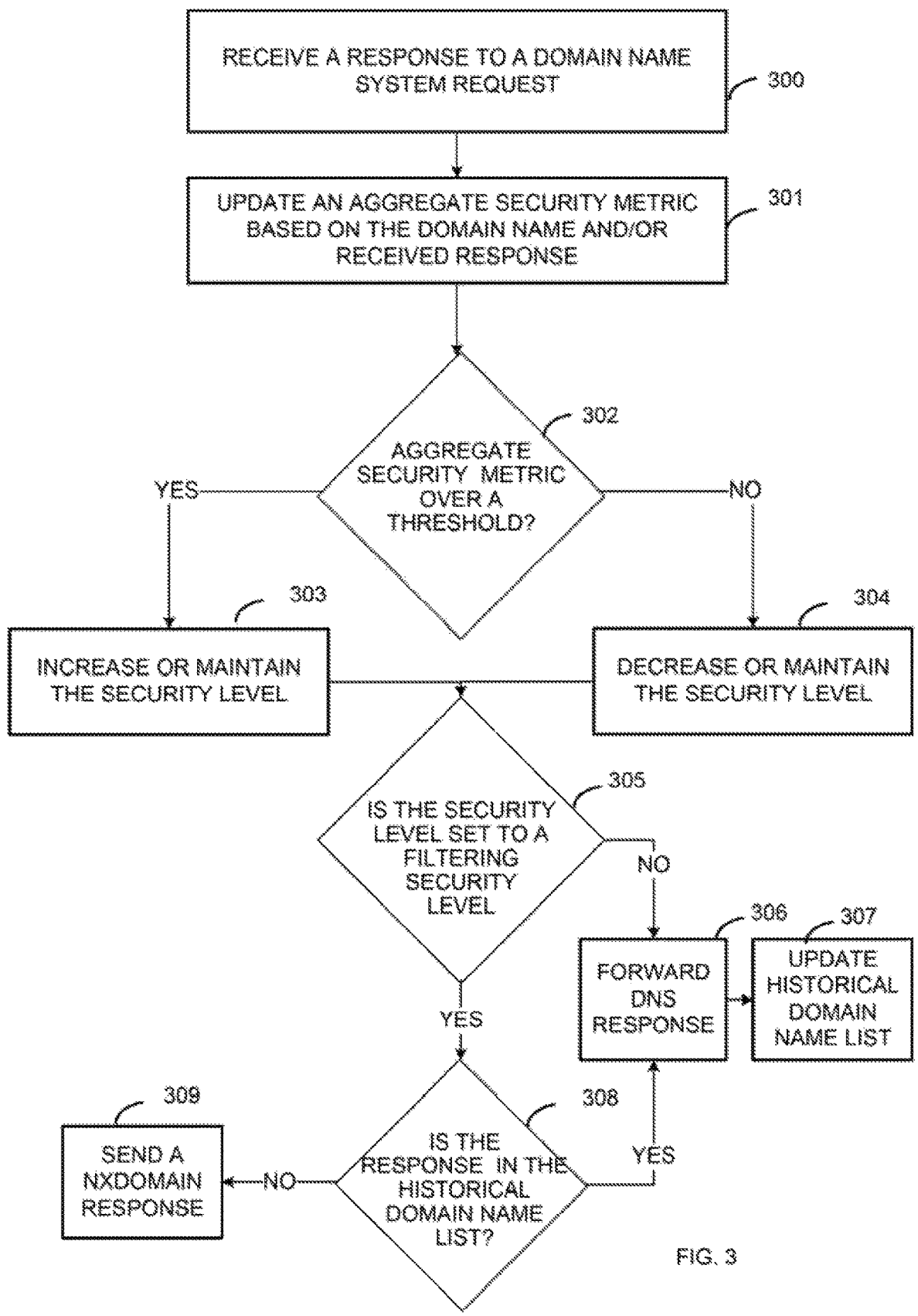
FIG. 3 is a flow chart illustrating one example of a method to determine IP address access based on security level and access history.

FIG. 3 is a flow chart illustrating one example of a method to determine IP address access based on a security level and access history. The method may be implemented, for example, by the computing system 100 of FIG. 1. Beginning at 300, a processor receives a response to a DNS request. The response may be an IP address corresponding to a domain name. Continuing to 301, a processor updates an aggregate security metric based on the domain name and/or received response. Continuing to 302, a processor determines whether the aggregate security metric is over a threshold. For example, the processor may determine if the number of NXDOMAIN responses per minute is over a threshold.

If determined that the aggregate security metric is over a threshold, continuing to 303, a processor increases or maintains the security level. For example, the security level may be set to a traffic filtering level or maintained at a traffic filtering level.

If determined that the aggregate security metric is not over a threshold, continuing to 304, a processor decreases or maintains the security level. For example, the security level may be set to a level where filtering is turned off and DNS responses are automatically forwarded for access.

Continuing to 305, a processor determines whether the security level is set to a filtering security level. If determined the security level is not sot to a filtering security level, continuing to 306, a processor forwards the DNS response such that the electronic device may communicate using the IP address received as the DNS response.

If determined the security level is set to a filtering security level, continuing to 308, a processor determines whether the domain name is in the address list. For example, the processor may determine if the domain name has been previously accessed or previously accessed according to a set of criteria. If determined that the domain name is in the address list, continuing to 306, a processor forwards the DNS response such that the IP address may be accessed. Continuing to 307, a processor updates the domain address list. For example, the processor may add information about the access to the domain name previous access information. If the domain name is not in the address list, the processor may add the domain name to the address list.

If determined that the domain name is not in the address list, continuing to 309, a processor sends an NXDOMAIN response such that the electronic device is unable to access the IP address received as the DNS response.

FIG. 4 is a diagram illustrating one example of IP address access differences based on different security levels. For example, there may be multiple security levels where each security level is associated with different criteria for determining whether to allow an electronic device to access an IP address received as a DNS response. The method may be implemented, for example, by the processor 101 of FIG. 1.

Block 400 shows a list of domain names and previous access information. For example, domain names www.x.com and www.y.com have been previously accessed, and www.x.com has been accessed more frequently and more recently than www.y.com.

Flow chart 410 shows a method for determining whether to allow access to an IP address based on previous access information and security level information. Beginning at 401, a processor receives IP 14.14.2.5 from a DNS server in response to a request for the IP address for domain name www.x.com. Continuing to 402, the processor determines if the electronic device is in a no filtering level. If yes, moving to 406, the processor accesses IP address 14.14.2.5 because no filtering is performed.

Continuing to 403 if the processor is not in a no filtering security level, the processor determines if the electronic device is in a first security level where the IP address is filtered according to whether the domain name is in the previous access list 400. Continuing to 407, the processor accesses IP address 14.14.2.5 because the domain name www.x.com is in the IP address access list 400.

Continuing to 404, if the security level is not in the first security level, the processor determines whether the electronic device is in a second security level such that access is allowed if the domain name was accessed within the last week. Continuing to 408, the processor allows access to the IP address 14.14.2.5 because www.x.com was most recently accessed 3 days ago, which is within the last week.

Continuing to 405, if the security level is not in the second security level, the processor determines if the electronic device is in a third security level such that access is allowed if the domain name was accessed more than 15 times in the last month. Continuing to 409, the IP address is blocked, and an NXDOMAIN response is returned because www.x.com was accessed fewer than 15 times in the past month.

Automatically making IP address access determinations for an electronic device based on a level of likelihood of a cyber threat and previous access information provides an efficient method of mitigating a cyberattack while taking into account effect on a user's ability to continue to use the electronic device.

The invention claimed is:

1. A computing system, comprising:
a processor; and
a non-transitory storage medium storing instructions executable on the processor to:
access information related to an Internet Protocol (IP) address provided in a Domain Name System (DNS) response to a DNS request including a domain name, the DNS request being from an electronic device to a DNS server;
update a security level based on at least one of the DNS request or the DNS response, wherein the security level as updated is one of a plurality of different security levels;
determine whether to allow the electronic device to access the IP address based on the security level as updated and a comparison of the domain name to historical domain name traffic information;
responsive to the security level as updated being a first security level of the plurality of different security levels, determine to allow the electronic device to access the IP address based on the historical domain name traffic information indicating that the domain name was accessed within a specified time frame; and
in response to determining to allow the electronic device to access the IP address, send a response that allows the electronic device to access the IP address.

2. The computing system of claim 1, wherein the updating of the security level comprises:
updating an aggregate security metric based on at least one of the DNS request or the DNS response; and
updating the security level based on a comparison of the aggregate security metric to security level criteria.

3. The computing system of claim 2, wherein the aggregate security metric is based on a quantity of DNS requests resulting in non-resolving responses.

4. The computing system of claim 2, wherein the updating of the security level is based on a frequency the aggregate security metric exceeded a threshold or an amount of time at which the security level has been heightened.

5. The computing system of claim 1, wherein the instructions are executable on the processor to augment the historical domain name traffic information based on machine learning.

6. A method comprising:
accessing, by a computing system comprising a hardware processor, information related to an Internet Protocol (IP) address received as a Domain Name System (DNS) response to a DNS request including a domain name, the DNS request being from an electronic device to a DNS server;
updating, by the computing system, a security level associated with the electronic device based on at least one of the DNS request or the DNS response, wherein the updated security level is one of a plurality of different security levels; and
responsive to the updated security level being a first security level of the plurality of different security levels, the computing system:
comparing the domain name to information related to previously accessed domain names;
determining whether to allow the electronic device to access the IP address based on the comparison;
determining to allow the electronic device to access the IP address based on the information related to previously accessed domain names indicating that the domain name was accessed within a specified time frame; and
in response to determining to not allow the electronic device to access the IP address, send a response that blocks the electronic device from accessing the IP address.

7. The method of claim 6, further comprising:
intercepting, by the computing system, the DNS response from the DNS server; and
in response to determining to allow the electronic device to access the IP address, forwarding, by the computing system, the DNS response to the electronic device.

8. The method of claim 6, wherein the updating of the security level comprises:
updating an aggregate security metric based on at least one of the DNS request or the DNS response; and
updating the security level based on the aggregate security metric.

9. A machine-readable non-transitory storage medium comprising instructions that upon execution cause a computing system to:
intercept a Domain Name System (DNS) response from a DNS server, the DNS response being responsive to a DNS request including a domain name from an electronic device;
update a security level associated with the electronic device based on at least one of the DNS request or the DNS response, wherein the updated security level is one of a plurality of different security levels;
determine whether to forward or block the DNS response to the electronic device based on the updated security level and a comparison of the domain name to stored information related to previous domain name traffic;
responsive to the updated security level being a first security level of the plurality of different security levels, determine to forward the DNS response to the electronic device based on the stored information related to previous domain name traffic indicating that the domain name was accessed within a specified time frame; and
output information related to the determination of whether to forward or block the DNS response.

10. The machine-readable non-transitory storage medium of claim 9, wherein the instructions to update the security level comprise instructions to:
compare DNS activity during a time period to security level criteria; and
update the security level based on the comparison.

11. The computing system of claim 1, wherein the instructions are executable on the processor to:
intercept the DNS response from the DNS server,
wherein the sending comprises forwarding the DNS response including the IP address from the DNS server to the electronic device.

12. The computing system of claim 1, wherein the instructions are executable on the processor to:
in response to determining to not allow the electronic device from accessing the IP address, send a further response that blocks the electronic device from accessing the IP address.

13. The computing system of claim 12, wherein the further response comprises an NXDOMAIN response.

14. The computing system of claim 1, wherein the instructions are executable on the processor to:
responsive to the security level as updated being a second security level of the plurality of different security levels, determine to allow the electronic device to access the IP address based on the historical domain name traffic information indicating that the domain name was accessed more than a specified quantity of times within a specified time frame.

15. The method of claim 6, wherein the response that blocks the electronic device from accessing the IP address comprises an NXDOMAIN response.

16. The method of claim 6, comprising:
responsive to the updated security level being a second security level of the plurality of different security levels, determining to allow the electronic device to access the IP address based on the information related to previously accessed domain names indicating that the domain name was accessed more than a specified quantity of times within a specified time frame.

17. The machine-readable non-transitory storage medium of claim 9, wherein the instructions upon execution cause the computing system to:
responsive to the updated security level being a second security level of the plurality of different security levels, determine to forward the DNS response to the electronic device based on the stored information related to previous domain name traffic indicating that the domain name was accessed more than a specified quantity of times within a specified time frame.

* * * * *